United States Patent
Tsuruda (10) Patent No.: US 6,976,554 B2
(45) Date of Patent: Dec. 20, 2005

(54) MOUNTING DEVICE FOR A V-CONFIGURED ENGINE

(75) Inventor: Takayuki Tsuruda, Shizuoka (JP)

(73) Assignee: Suzuki Motor Corporation, Shizuoka-ken (JP)

(*) Notice: Subject to any disclaimer, the term of this patent is extended or adjusted under 35 U.S.C. 154(b) by 119 days.

(21) Appl. No.: 10/237,117

(22) Filed: Sep. 9, 2002

(65) Prior Publication Data

US 2003/0062211 A1 Apr. 3, 2003

(30) Foreign Application Priority Data

Sep. 28, 2001 (JP) .................................. 2001-301926

(51) Int. Cl.$^7$ ................................................ B60K 1/00
(52) U.S. Cl. ......................................... 180/291; 180/312
(58) Field of Search ............................... 180/312, 291, 180/295, 297, 299, 300; 248/637, 646, 674; 123/195 A, 195

(56) References Cited

U.S. PATENT DOCUMENTS

| | | | | |
|---|---|---|---|---|
| 2,044,714 A | * | 6/1936 | Trott | 248/604 |
| 4,779,834 A | * | 10/1988 | Bittner | 248/638 |
| 4,793,300 A | * | 12/1988 | Kadoshima et al. | 123/195 A |
| 5,437,344 A | * | 8/1995 | Wada | 180/291 |
| 5,450,922 A | * | 9/1995 | Doi et al. | 180/297 |
| 6,105,548 A | | 8/2000 | Carlson et al. | |

FOREIGN PATENT DOCUMENTS

| | | | |
|---|---|---|---|
| JP | 5-33896 | * | 2/1988 |
| JP | 5-33896 | | 2/1993 |
| JP | 6-27268 | | 4/1994 |
| JP | 6-193460 | * | 7/1994 |
| JP | 7-259578 | * | 10/1995 |
| JP | 10-280967 | * | 10/1998 |
| JP | 11-22341 | * | 8/1999 |

OTHER PUBLICATIONS

English Language Abstract of JP 5-33896.
English Language Abstract of JP 6-193460.
English Language Translation of JP 7-259578.

* cited by examiner

Primary Examiner—Bryan Fischmann
(74) Attorney, Agent, or Firm—Greenblum & Bernstein, P.L.C.

(57) ABSTRACT

A substantially V-shaped cylinder block is provided with a chain arrangement for transmitting the rotation of a crankshaft to camshafts, a chain cover for covering the chain arrangement at the front side of the cylinder block, and a mounting bracket fixed to a mounting portion disposed at the top of an engine bank of the cylinder block and to a mounting portion disposed at an outer side of a cylinder bank of the cylinder block.

24 Claims, 8 Drawing Sheets

MOUNTING DEVICE FOR A V-CONFIGURED ENGINE

BACKGROUND OF THE INVENTION

1. Field of the Invention

The present invention relates to a mounting device for a V-configured engine, and in particular, to a mounting device for a V-configured engine in which the mounting strength of an engine mounting bracket is increased without reinforcing other component parts, such as a chain cover, that are positioned adjacent to the engine mounting bracket and without increasing the size and weight of the V-configured engine.

2. Description of the Related Art

Automotive engines, which may be in-line engines, V-configured engines, and the like, are mounted on automobile bodies by being resiliently supported by mounting devices so that vibrations due to variations in the driving force of the engine are not transmitted to the automobile bodies. The mounting devices include engine mounting brackets mounted on the engines, body-side mounting brackets mounted on the bodies, and engine mounts for connecting between the engine mounting brackets and the body side mounting brackets, thereby resiliently supporting the engines.

Such mounting devices for a V-configured engine are disclosed in, for example, Japanese Unexamined Utility Model Application Publication No. 6-27268, and Japanese Unexamined Patent Application Publication Nos. 5-33896 and 6-193460.

The mounting device disclosed in Japanese Unexamined Utility Model Application Publication No. 6-27268, is such that in an engine which is transversely mounted between a pair of side frames and is resiliently supported via an engine mount at one of the side frames at an intermediate portion of a front end of the engine in the crankshaft-axial direction, an idler is mounted on the engine substantially at an intermediate portion of the front end of the engine via an idler-mounting bracket, and the idler-mounting bracket extends toward a front side-frame, the extending portion of the idler-mounting bracket being connected to the engine mount.

The mounting device disclosed in Japanese Unexamined Patent Application Publication No. 5-33896 is such that in a V-configured internal combustion engine provided with a timing chain mounted between camshafts of both banks and a crankshaft, a water pump is disposed between the camshaft of one of the banks and the crankshaft, a water pump sprocket engages the timing chain at the rear side thereof, and an engine-mount boss is formed at a central portion of the banks enclosed by the timing chain.

The mounting device disclosed in Japanese Unexamined Patent Application Publication No. 6-193460 is such that in a transverse V-configured engine, a chain is mounted on a first sprocket of an intake camshaft of one bank, a second sprocket of an exhaust camshaft of the other bank, and a third sprocket of a crankshaft, a cover for covering the chain is provided, an engine-mounting bracket including a clamp portion is disposed between the banks, a lower portion of the engine-mounting bracket is fixed to a cylinder block together with a block-side portion of the chain cover by screws as are commonly used, and an upper portion of the engine-mounting bracket is fixed to a cylinder head disposed under the intake camshaft of the other bank together with a cylinder-head-side portion of the chain cover by screws as are commonly used.

A mounting device for a V-configured engine includes a bracket-mounting portion at the top of a cylinder block in a space between the engine banks, an engine-mounting bracket mounted at the bracket-mounting portion, a body-side mounting bracket mounted at the body side, and an engine-mount which connects the engine-mounting bracket and the body-side mounting bracket, whereby the mounting device resiliently supports a V-configured engine.

The mounting device for a V-configured engine may be provided with a bracket-mounting portion formed on a component portion, such as a chain cover or a cylinder head, other than that provided on the cylinder block, in order to increase the mounting strength of the engine-mounting bracket.

However, when the bracket-mounting portion is formed on the chain cover or the cylinder head, there is a risk of deformation of the chain cover or the cylinder head due to an external force applied to the engine-mounting bracket, thereby causing leakage of oil or cooling water.

In the known mounting devices, the mounting strength must be increased by reinforcing the chain cover or the cylinder head. As a result, however, a problem in that the engine cannot be easily mounted to an automobile body occurs because the size and the weight of the engine increase because of the reinforcement by increasing the wall thickness, forming ribs, or the like.

On the other hand, when the bracket-mounting portion disposed on the chain cover or the cylinder head is omitted, the mounting strength may be decreased because of an insufficient supporting force of the engine-mounting bracket.

SUMMARY OF THE INVENTION

Accordingly, it is an object of the present invention to provide a mounting device for a V-configured engine, in which the mounting strength of an engine mounting bracket may be increased without reinforcing other component parts disposed adjacent to the engine mounting bracket and without increasing the size and weight of the V-configured engine.

To this end, according to an aspect of the present invention, a mounting device is provided for a V-configured engine in which engine banks include cylinder banks of a V-shaped cylinder block, each cylinder bank having a cylinder head mounted thereon, and the cylinder block is provided with a crankshaft journaled by bearings. Each cylinder head is provided with camshafts journaled by bearings, a chain arrangement for transmitting the rotation of the crankshaft to the camshafts is provided at front ends of the cylinder block and the cylinder heads in a crankshaft-axial direction, and a chain cover for covering the chain arrangement is mounted on front end faces of the cylinder block and the cylinder heads. The mounting device includes a top bracket mount disposed at a top of the cylinder block in a space between the engine banks; an outer-side bracket-mounting portion provided at an outer side of one of the cylinder banks of the cylinder block; and an engine-mounting bracket provided at a front side of the chain cover and fixed to the top-side bracket-mounting portion and the outer-side bracket-mounting portion at respective longitudinal ends of the engine-mounting bracket.

In the mounting device for a V-configured engine, according to the present invention, an external force applied to an engine-mounting bracket is received only by a cylinder block without using other component parts such as a chain cover or a cylinder head. Therefore, it is not necessary to reinforce the other component parts. Since the engine-mounting bracket is fixed to two positions separated or spaced from each other, that is, the top-side bracket-mounting portion provided at the top of the cylinder block and the outer-side bracket-mounting portion provided at the outer side of a cylinder bank of the cylinder block, the engine-mounting bracket can be supported firmly.

In the mounting device for a V-configured engine, according to the present invention, since it is not necessary to reinforce the other component parts such as a chain cover, the size and the weight of the V-configured engine are not increased because it is not necessary to increase the wall thickness or to form ribs for reinforcement, whereby the V-configured engine can be easily mounted on an automobile body. Since the engine-mounting bracket can be supported firmly, a sufficient supporting force is obtainable, thereby increasing the mounting strength of the engine-mounting bracket.

An aspect of the present invention provides a mounting device for a V-configured engine in which engine banks include cylinder banks of a V-configured cylinder block, each cylinder bank including a cylinder head mounted thereon. The cylinder block is provided with a crankshaft journaled by bearings, and each cylinder head is provided with camshafts journaled by bearings, A chain arrangement to transmit rotation of the crankshaft to the camshafts is provided at front ends of the cylinder block and the cylinder heads in an axial direction of the crankshaft, and a chain cover to cover the chain arrangement is mounted on front end faces of the cylinder block and the cylinder heads. The mounting device includes a top bracket mount provided at a top of the cylinder block in a space between the engine banks; an outer bracket mount provided at an outer side of one of the cylinder banks of the cylinder block; and an engine mounting bracket provided at a front side of the chain cover and fixed to the top bracket mount and the outer bracket mount at respective longitudinal ends of the engine mounting bracket.

In a further aspect of the present invention, the chain arrangement may include a first chain to transmit rotation of the crankshaft to an intermediary shaft mounted on one of the cylinder heads and one of the camshafts journaled by bearings in the other one of the cylinder heads, and a second chain to transmit rotation of the crankshaft through the intermediary shaft to the camshafts journaled by bearings in the one of the cylinder heads, the second chain being provided at the front side of the first chain. The chain cover may include a first chain cover portion to cover the first chain, and a second chain cover portion to cover the second chain that projects forward from the first chain cover portion, and a water pump pulley of a water pump provided at a front end face of the other one of the cylinder banks extending forward from a portion opposing the other one of the cylinder banks; and wherein the engine mounting bracket is provided in a recess formed in a front side of the first chain cover portion between the water pump pulley and the second chain cover portion.

Further, the engine mounting bracket may include a first mounting bracket portion to be mounted on the top bracket mount and a second mounting bracket portion to be mounted on the outer bracket mount. The first mounting bracket portion may further be provided with a top mounting flange to be mounted on the top bracket mount, the top mounting flange provided with a plurality of mounting holes formed along the periphery thereof and a hole through which a cooling water pipe for guiding cooling water to the cylinder block passes formed at a central portion of the top mounting flange enclosed by the plurality of mounting holes. The first mounting bracket portion may include a top connecting flange and a connection portion that connects the top mounting flange and the top connection flange, wherein the top connecting flange includes a surface positioned parallel to the front face of the cylinder block. The top connecting flange may include a plurality of threaded holes for connection with the second mounting bracket portion.

In a further aspect of the present invention, the second mounting bracket portion may include an outer mounting flange to be mounted on the outer bracket mount, the outer mounting flange provided with a plurality of mounting holes corresponding to a plurality of mounting holes provided in the outer bracket mount. The second mounting bracket portion may include an extension portion extending from the outer mounting flange and an outer connecting flange provided at the distal end of the extension portion, the outer connecting flange including a surface positioned parallel to the front face of the cylinder block; and the outer connecting flange may include a plurality of mounting holes for connection with the first mounting bracket portion. The second mounting bracket portion may further include an engine mount mounting portion extending from the extension portion in a forward direction, the engine mount mounting portion configured to receive an engine mount.

In a further aspect of the present invention, the second mounting bracket portion further may include a central mounting flange provided on the extension portion, the central mounting flange configured to connect with a central block mounting portion of the cylinder block.

A further aspect of the present invention provides an engine mounting bracket including an extension portion; a top mounting flange provided at a longitudinal end of the extension portion, the top mounting flange including mounting holes for connection with threaded holes on a top bracket mount; and an outer mounting flange provided at the other longitudinal end of the extension portion, the outer mounting flange including mounting holes for connection with threaded holes on an outer bracket mount. The top mounting flange and the outer mounting flange of the mounting bracket may be further connected to the cylinder block with chain cover connecting elements. Further, the mounting bracket may further include an engine mount mounting portion extending from an intermediate position of the extension portion in a forward direction, the engine mount mounting portion for mounting an engine mount.

Another aspect of the present invention provides an engine mounting bracket for attachment to a V-configured engine, the engine mounting bracket including end portions spaced from each other in a longitudinal direction of the engine mounting bracket; and the engine mounting bracket being configured to be fixed to the V-configured engine on a top bracket mount and an outer bracket mount at respective end portions of the engine mounting bracket so that the engine mounting bracket is provided at a front side of a chain cover of the V-configured engine.

BRIEF DESCRIPTION OF THE DRAWINGS

The above, and other objects, features and advantages of the present invention will be made apparent from the following description of the preferred embodiments, given as non-limiting examples, with reference to the accompanying drawings in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A mounting device for a V-configured engine according to the present invention includes a top bracket mount disposed at the top of a cylinder block in a space between engine banks, an outer bracket mount disposed at an outer side of one cylinder bank of the cylinder block, and an engine-mounting bracket disposed at a front side of a chain cover and mounted on the top bracket mount and the outer bracket mount at the respective longitudinal ends of the engine-mounting bracket. With this arrangement, an external force applied to the engine-mounting bracket is received only by the cylinder block and not by other component portions such as the chain cover and a cylinder head. Therefore, it is not necessary to reinforce the other component portions. The engine-mounting bracket can be firmly supported because the engine-mounting bracket is mounted on two positions away from each other, that is, on the top bracket mount disposed at the top of the cylinder block and the outer bracket mount disposed at the outer side of the one cylinder bank of the cylinder block.

Figure 1:
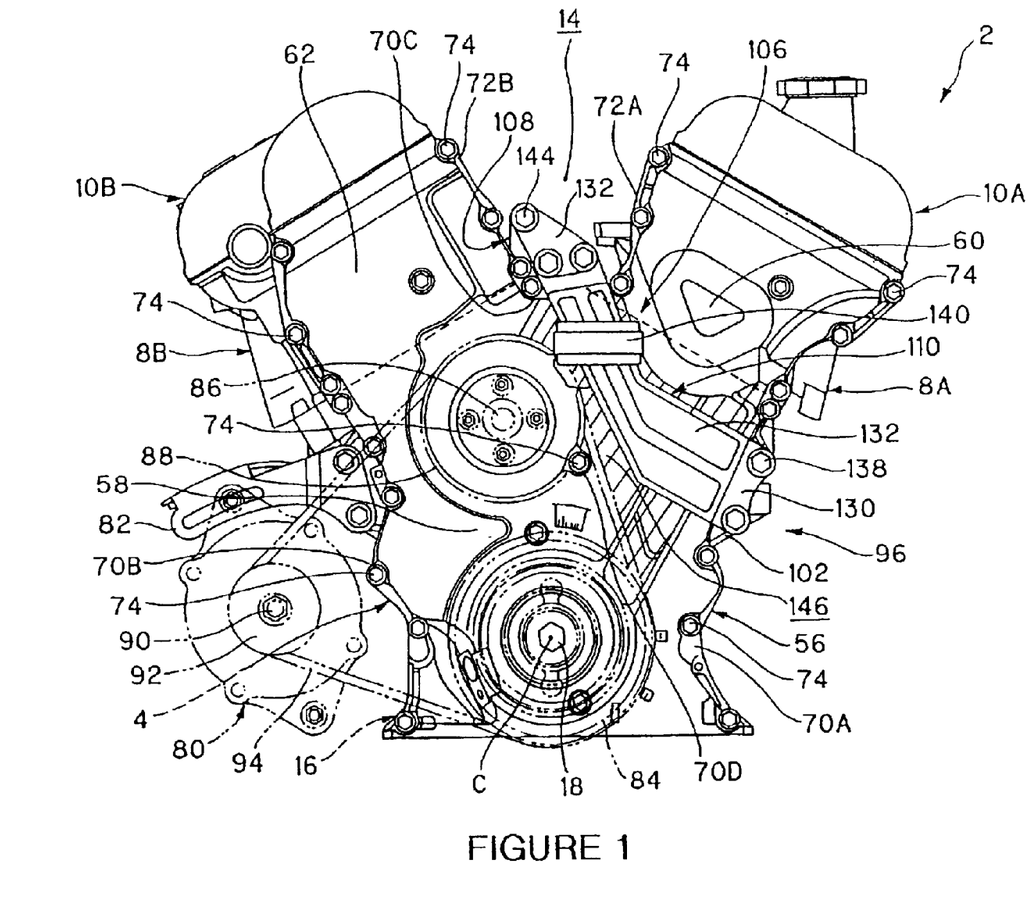
FIG. 1 is a front view of a V-configured engine provided with a mounting device according to a first embodiment of the present invention.
Figure 2:
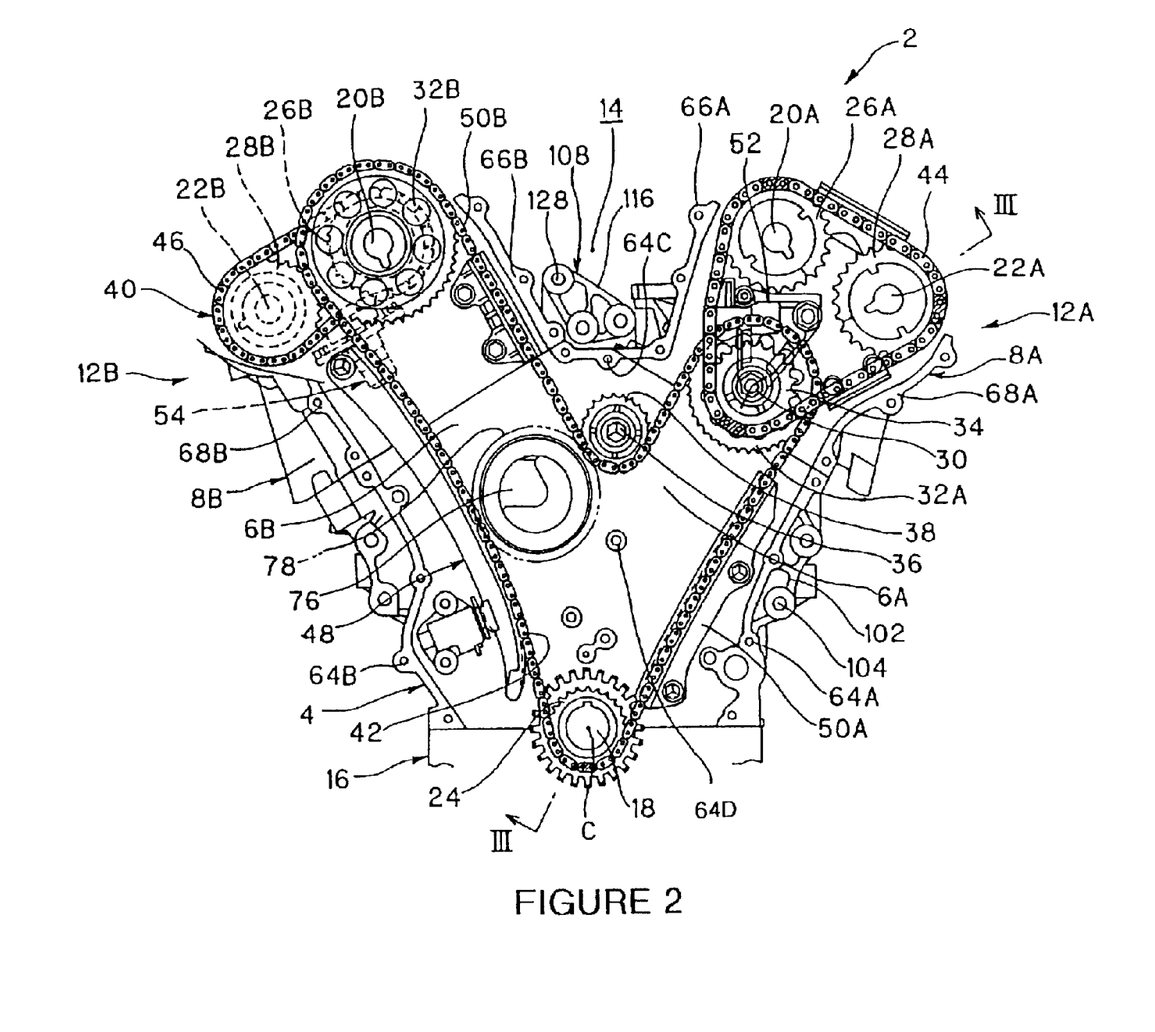
FIG. 2 is a front view of the V-configured engine shown in FIG. 1 with a chain cover removed.

With reference to the attached drawings, preferred embodiments according to the present invention are described below. FIGS. 1 to 4 show a first embodiment according to the present invention. FIGS. 1 and 2 are front views of a V-configured engine 2. The V-configured engine 2 includes a substantially V-shaped cylinder block 4 provided with cylinder heads 8A and 8B which are mounted on the cylinder block 4 at cylinder banks 6A and 6B, respectively, and head covers 10A and 10B mounted on the cylinder heads 8A and 8B, respectively, so as to form engine banks 12A and 12B, respectively. A space 14 is provided between the engine banks 12A and 12B.

The V-configured engine 2 includes a crankcase 16 under the cylinder block 4, the crankcase journaling a crankshaft 18 with bearings, and an oil pan (not shown) under the crankcase 16. The V-configured engine 2 also includes intake and exhaust camshafts 20A and 22A journaled by bearings at the cylinder head 8A and intake and exhaust camshafts 20B and 22B journaled by bearings at the cylinder head 8B.

Figure 3:
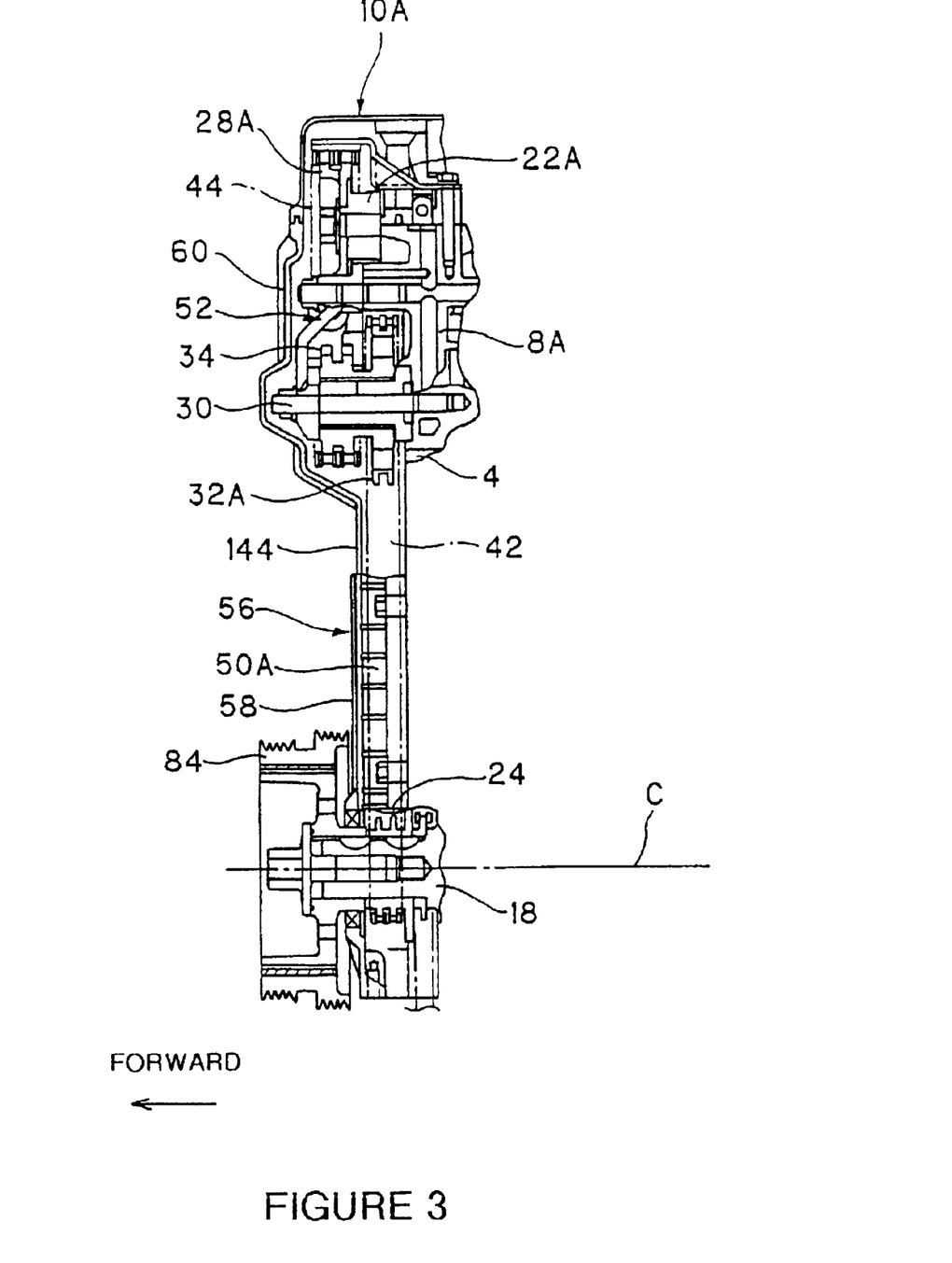
FIG. 3 is a cross-sectional view of the V-configured engine taken along line III—III of FIG. 2.

As shown in FIG. 3, a crank sprocket 24 is provided at a front end of the crankshaft 18 in the axial direction C of the crankshaft 18. Intake and exhaust camshaft sprockets 26A and 28A are mounted on the intake and exhaust camshafts 20A and 22A, respectively, at front ends thereof and farther forward than the crank sprocket 24 in the axial direction C of the crankshaft 18, as shown by the arrow in FIG. 3. Intake and exhaust camshaft sprockets 26B and 28B are mounted on the intake and exhaust camshafts 20B and 22B, respectively, at front ends thereof and farther back than the crank sprocket 24 in the axial direction C of the crankshaft 18.

An intermediary shaft 30 is provided at a front end of the cylinder head 8A in the axial direction C of the crankshaft between the intake and exhaust camshafts 20A and 22A and the crankshaft 18. As shown in FIG. 3, the intermediary shaft 30 is provided with an intermediary sprocket 32A and a cam sprocket 34 formed integrally with each other which are journaled by bearings. The intermediary sprocket 32A is disposed at the same position in the axial direction C of the crankshaft 18 as the crank sprocket 24. The cam sprocket 34 is disposed at the same position in the axial direction C as the intake and exhaust camshaft sprockets 26A and 28A.

As shown in FIG. 2, the intake camshaft 20B is provided with an intermediary sprocket 32B mounted at an end thereof. The intermediary sprocket 32B is disposed at the front side of the intake camshaft sprocket 26B in the axial direction C and at the same position in the axial direction C as the crank sprocket 24. An idler shaft 36 is mounted on the cylinder block 4 at a front end thereof in the crankshaft-axial direction C and at an upper portion of a widthwise-intermediate portion between the cylinder banks 6A and 6B. The idler shaft 36 is provided with an idler sprocket 38 journaled by bearings. The idler sprocket 38 is disposed at the same position as the crank sprocket 24 in the crankshaft-axial direction C.

The V-configured engine 2 includes a chain arrangement 40 provided at front sides of the cylinder block 4 and the cylinder heads 8A and 8B in the crankshaft-axial direction C. The chain arrangement 40 includes first, second, and third chains 42, 44, and 46.

The first chain 42 is mounted on the crank sprocket 24, the intermediary sprocket 32A, the intermediary sprocket 32B, and the idler sprocket 38, and transmits the rotation of the crankshaft 18 to the intermediary shaft 30 and the intake camshaft 20B. The second chain 44 is mounted on the intake and exhaust camshaft sprockets 26A and 28A and the cam sprocket 34, and transmits the rotation of the crankshaft 18, which is transmitted to the intermediary shaft 30, to the intake and exhaust camshafts 20A and 22A. The third chain 46 is mounted on the intake and exhaust cam sprockets 26B and 28B, and transmits the rotation of the crankshaft 18 to the exhaust camshaft 22B.

The chain arrangement 40 includes a first chain tensioner 48 for applying a given tensile force to the first chain 42, first chain guides 50A and 50B for stabilizing the travel of the first chain 42, a second chain tensioner 52 for applying a given tensile force to the second chain 44, and a third chain tensioner 54 for applying a given tensile force to the third chain 46.

The chain arrangement 40, which is formed with the first to third chains 42, 44, and 46, respectively, is covered with a chain cover 56 mounted on front end faces of the cylinder block 4 and the cylinder heads 8A and 8B. As shown in FIG. 1, the chain cover 56 is provided with a first chain-cover portion 58 which covers the first chain 42 at the front side of the cylinder block 4, a second chain-cover portion 60 which protrudes forward from the first chain-cover portion 58 and covers the second chain 42 at the front side of the cylinder block 8A, and a third chain-cover portion 62 which covers the first chain-cover portion 58 and the third chain 46 at the front side of the cylinder head 8B.

The cylinder block 4 is provided, as shown in FIG. 2, with outer block-side mounting portions 64A and 64B at the front ends of the cylinder banks 6A and 6B, respectively, an upper block-side mounting portion 64C at an intermediate portion between the cylinder banks 6A and 6B and at upper sides of the front ends thereof, and a central block-side mounting portion 64D. The cylinder head 8A is provided with inner and outer head-side mounting portions 66A and 68A at inner and outer sides, respectively, of the front end of the cylinder head 8A. The cylinder head 8B is provided with inner and outer head-side mounting portions 66B and 68B at inner and outer sides, respectively, of the front end of the cylinder head 8B.

In FIG. 1, the chain cover 56 is provided at outer sides thereof with outer cover-side mounting portions 70A and 70B, at an upper side thereof with an upper cover-side mounting portion 70C, at a central portion thereof with a central cover-side mounting portion 70D, and at inner sides thereof with inner cover-side mounting portions 72A and 72B. The outer cover-side mounting portion 70A comes into contact with the outer block-side mounting portion 64A and the outer head-side mounting portion 68A, the outer cover-side mounting portion 70B comes into contact with the outer block-side mounting portion 64B and the outer head-side mounting portion 68B, the upper cover-side mounting portion 70C comes into contact with the upper block-side mounting portion 64C, the central cover-side mounting portion 70D comes into contact with the central block-side mounting portion 64D, and the inner cover-side mounting portions 72A and 72B come into contact with the inner head-side mounting portions 66A and 66B, respectively, whereby the chain cover 56 is fixed to the front end faces of the cylinder block 4 and the cylinder heads 8A and 8B by cover-fixing, threaded bolts 74.

The V-configured engine is provided with a water pump 78 mounted so as to be covered with the water pump 78 at a water-pump swirl chamber 76 formed at the front side of the cylinder bank 6B of the cylinder block 4, as shown in FIG. 2. The V-configured engine 2 is provided with an alternator 80 mounted via an alternator-mounting bracket 82 at the outer side of the outer block-side mounting portion 64B of the cylinder block 4, as shown in FIG. 1.

In FIG. 3, the crankshaft 18 protrudes forward through the first chain-cover portion 58 covering the crank sprocket 24. The crankshaft 18 is provided with an accessory pulley 84 at the front end thereof protruding forward from the first chain-cover portion 58. A pump axle 86 of the water pump 78, which is provided at the front end face of the cylinder bank 6B of the cylinder block 4, protrudes forward at a front end of the pump axle 86 through the first chain-cover portion 58 covering the water pump 78 which is provided at the front side of the cylinder bank 6B, as shown in FIG. 1. The pump axle 86 of the water pump 78, which protrudes forward from the first chain-cover portion 58 covering the water pump 78, is provided with a water pump pulley 88 mounted at the front end of the pump axle 86. The alternator 80 is provided with an alternator pulley 92 mounted at the front end of an alternator axle 90. The accessory pulley 84, the water pump pulley 88, and the alternator pulley 92 are mounted with an accessory belt 94 at the front side of the first chain-cover portion 58.

Figure 4:
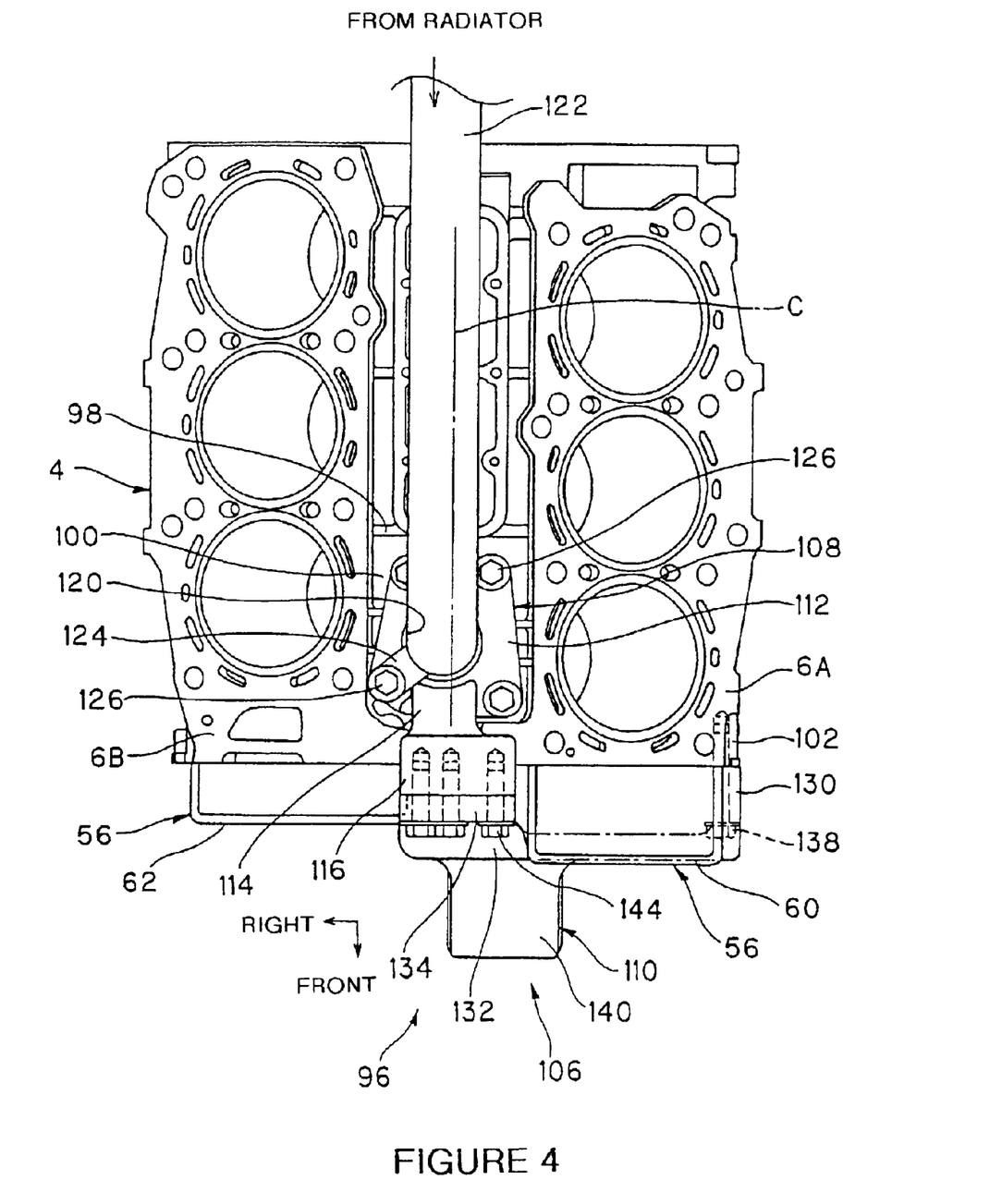
FIG. 4 is a plan view of a cylinder block of the V-configured engine shown in FIG. 1.

The V-configured engine 2 is supported by an automobile body (not shown) via a mounting device 96. As shown in FIG. 4, the mounting device 96 includes a top bracket mount 100 disposed in the vicinity of a front end of a block top 98 of the cylinder block 4 and in the space 14 between the engine banks 12A and 12B, and a plurality of screw holes (not shown) formed along the periphery of the top bracket mount 100. The mounting device 96 also includes an outer bracket mount 102 disposed outside the outer block-side mounting portion 64A shown in FIG. 2, which is formed at the outer side of the front end of the cylinder bank 6A of the cylinder block 4, and a plurality of screw holes (not shown) along the outer side.

The mounting device 96 includes an engine mounting bracket 106 disposed at the front side of the chain cover 56 so as to be mounted on the top bracket mount 100 and the outer bracket mount 102 at the respective longitudinal ends of the engine-mounting bracket 106. The engine-mounting bracket 106 includes a first mounting bracket portion 108 to be mounted on the top bracket mount 100 and a second mounting bracket portion 110 to be mounted on the outer bracket mount 102.

Figure 5:
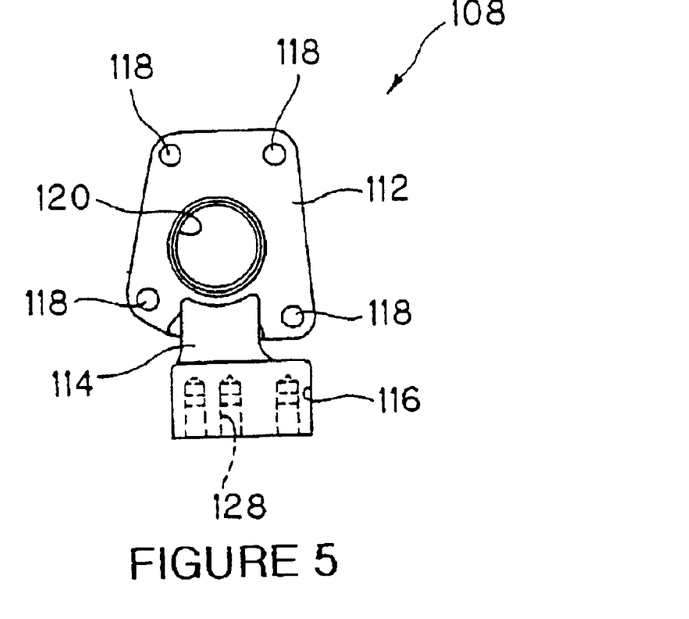
FIG. 5 is a plan view of a first mounting bracket part.

In FIG. 5, the first mounting bracket portion 108 includes a top mounting flange 112 to be mounted on the top bracket mount 100, a connecting portion 114, and a top connecting flange 116 connected to the top mounting flange 112 via the connecting portion 114, the top connecting flange 116 to be disposed parallel to the front end face of the cylinder block 4.

The top mounting flange 112 is provided with a plurality of mounting holes 118 along the periphery thereof, the mounting holes 118 associating with the plurality of holes formed in the top bracket mount 100, and a through-hole 120 formed in a central portion of the top mounting flange 112 enclosed by the mounting holes 118. A cooling-water pipe 122 for guiding cooling water from a radiator (not shown) to a water jacket (not shown) of the cylinder block 4 passes through the through-hole 120, as shown in FIG. 4.

The cooling-water pipe 122 is provided with a fixing bracket 124. The fixing bracket 124 is fixed to the top bracket mount 100 by fixing bolt 126 together with the top mounting flange 112. The top connecting flange 116 is provided therein with a plurality of threaded holes 128.

Figure 6:
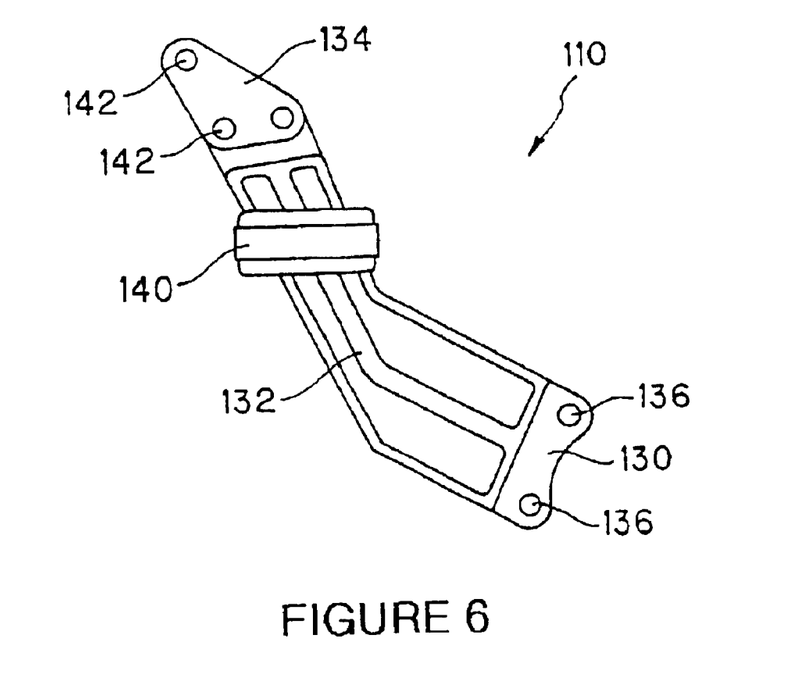
FIG. 6 is a front view of a second mounting bracket part.

As shown in FIG. 6, the second mounting bracket portion 110 includes an outer mounting flange 130 to be mounted on the outer bracket mount 102, an extension portion 132 extending from the outer mounting flange 130 toward the upper side of a widthwise intermediate portion between the cylinder banks 6A and 6B, and an outer connecting flange 134 disposed at the extended end of the extension portion 132, the outer connecting flange 134 to be connected to the top connecting flange 116.

The outer mounting flange 130 is provided therein with a plurality of mounting holes 136 associating with threaded holes 104 formed in the outer bracket mount 102. The outer mounting flange 130 is fixed to the outer bracket mount 102 by fixing bolts 138. The extension portion 132 is provided with an engine mount mounting portion 140 protruding forward, for mounting an engine mount (not shown). The outer connecting flange 134 is provided with a plurality of mounting holes 142 associating with the threaded holes 128 of the top connecting flange 116. The outer connecting flange 134 is fixed to the top connecting flange 116 by fixing bolts 144.

In the V-configured engine 2, the chain cover 56 is provided with the second chain-cover portion 60 for covering the second chain 44 and projecting toward the front side from the first chain-cover portion 58, and the water pump pulley 88 of the water pump 78 disposed at the front end face of the cylinder bank 6B of the cylinder block 4, the water pump pulley 88 projecting forward from the first chain-cover portion 58 which opposes the cylinder bank 6B.

The mounting device 96 of the V-configured engine 2 includes the engine-mounting bracket 106 which is disposed at the front side of the chain cover 56 and is fixed to the top bracket mount 100 disposed at the block top 98 of the cylinder block 4 and the outer bracket mount 102 disposed at the outer side of the cylinder bank 6A of the cylinder block 4 at the respective longitudinal ends of the engine-mounting bracket 106. The extension portion 132 of the second mounting bracket portion 110, which is included in the engine-mounting bracket 106, is disposed between the water pump pulley 88 protruding forward from the first chain-cover portion 58 and the second chain-cover portion 60 and in a recess 146 shown by a dotted line in FIG. 1, which is formed in the front side of the first chain-cover portion 58.

The mounting device 96 operates as follows.

The mounting device 96 of the V-configured engine 2 connects the engine-mounting bracket 106 and a body-side mounting bracket (not shown) provided at the body side via an engine mount (not shown) provided at the engine mount mounting portion 140, thereby mounting and resiliently supporting the V-configured engine 2 on the automobile body.

The mounting device 96 includes the top bracket mount 100 disposed at the block top 98 of the cylinder block 4 in the space 14 between the engine banks 12A and 12B, the outer bracket mount 102 at the outer side of the cylinder bank 6A of the cylinder block 4, and the engine-mounting bracket 106 disposed at the front side of the chain cover 56 and fixed to the top bracket mount 100 and the outer bracket mount 102 at the respective longitudinal ends of the engine-mounting bracket 106.

With this arrangement, the mounting device 96 receives an exterior force applied to the engine-mounting bracket 106 only at the cylinder block 4 without receiving the exterior force at other component portions such as the chain cover 56 or the cylinder head 8A or 8B; therefore, it is not necessary to reinforce the other component parts. Since the engine-mounting bracket 106 is mounted at two positions spaced from each other, such as the top bracket mount 100 at the block top 98 of the cylinder block 4 and the outer bracket mount 102 at the outer side of the cylinder bank 6A of the cylinder block 4, the engine-mounting bracket 106 can be supported firmly.

Since the other component parts such as the chain cover 56 of the mounting device 96 of the V-configured engine 2 are not necessarily reinforced, the increase of the size and weight of the mounting device 96 due to increase of the wall thickness or to rib formation for reinforcing can be avoided, whereby the V-configured engine 2 can be easily mounted on an automobile body. With the firmly supported engine-mounting bracket 106, the mounting strength of the engine-mounting bracket 106 can increase, by which a sufficient supporting force is obtainable.

In the mounting device 96, the engine-mounting bracket 106 is disposed between the water pump pulley 88 protruding forward from the first chain-cover portion 58 and the second chain-cover portion 60 and in the recess 146 formed in the front side of the first chain-cover portion 58, whereby the engine-mounting bracket 106 can be disposed without being projected toward the front side of the V-configured engine 2 by using the recess 146 which is a dead space between the water pump pulley 88 and the second chain-cover portion 60 at the front side of the chain cover 56. The longitudinal length of the V-configured engine 2 can be reduced, whereby the V-configured engine 2 can be easily mounted on an automobile body.

The engine-mounting bracket 106 of the mounting device 96 includes the first mounting bracket portion 108 to be mounted on the top bracket mount 100 and the second mounting bracket portion 110 to be mounted on the outer bracket mount 102. Therefore, the chain cover 56 can be easily removed by removing one of the first and second mounting bracket portions 108 and 110 (the second mounting bracket portion 110, according to the first embodiment), whereby disassembly can be easily performed and serviceability can be improved.

The top mounting flange 112 of the first mounting bracket portion 108 of the mounting device 96 is provided with a plurality of the mounting holes 118 formed along the periphery of the top mounting flange 112, for mounting on the top bracket mount 100, and the through-hole 120 formed in a central portion enclosed by the plurality of mounting holes 118, through which the cooling-water pipe 122 for guiding cooling water from a radiator (not shown) to a water jacket (not shown) passes, whereby the cooling-water pipe 122 for guiding cooling water to the cylinder block 4 can be connected to the water pump 78 provided at the front side of the V-configured engine 2 without interference with the first mounting bracket portion 108, thereby simplifying the flow system of cooling water in the cylinder block 4.

Since the mounting device 96 includes the top bracket mount 100 disposed at the block top 98, to which the first mounting bracket portion 108 is fixed and which is not a mounting portion for the chain cover 56, sealing materials such as liquid-system-side gaskets or 0-rings are not necessary, whereby the assembly can be performed easily.

Although according to the first embodiment, the top mounting flange 112 of the first mounting bracket portion 108 and the cooling-water pipe 122 are formed independently from each other, these component parts may be formed unitarily and in one piece with each other. Although the second mounting bracket portion 110 is fixed by the fixing bolts 138 to the outer bracket mount 102 disposed at the outer side of the block-side mounting portion 64A, to which the chain cover 56 is fixed, independently from the chain cover 56, the second mounting bracket portion 110 may be affixed together with the chain cover 56 by using common fixing bolts. When the second mounting bracket portion 110 is affixed independently from the chain cover 56, there is a risk of oil leakage from the outer bracket mount 102 of the cylinder bank 6A when the cylinder block 4 vibrates strongly. Therefore, by affixing the second mounting bracket portion 110 together with the chain cover 56 by using common fixing bolts at positions disposed at the outer side of the seal line of the chain cover 56, the chain cover 56 can vibrate at the same time and oil leakage due to concentration of vibration to a limited area can be avoided.

Figure 7:
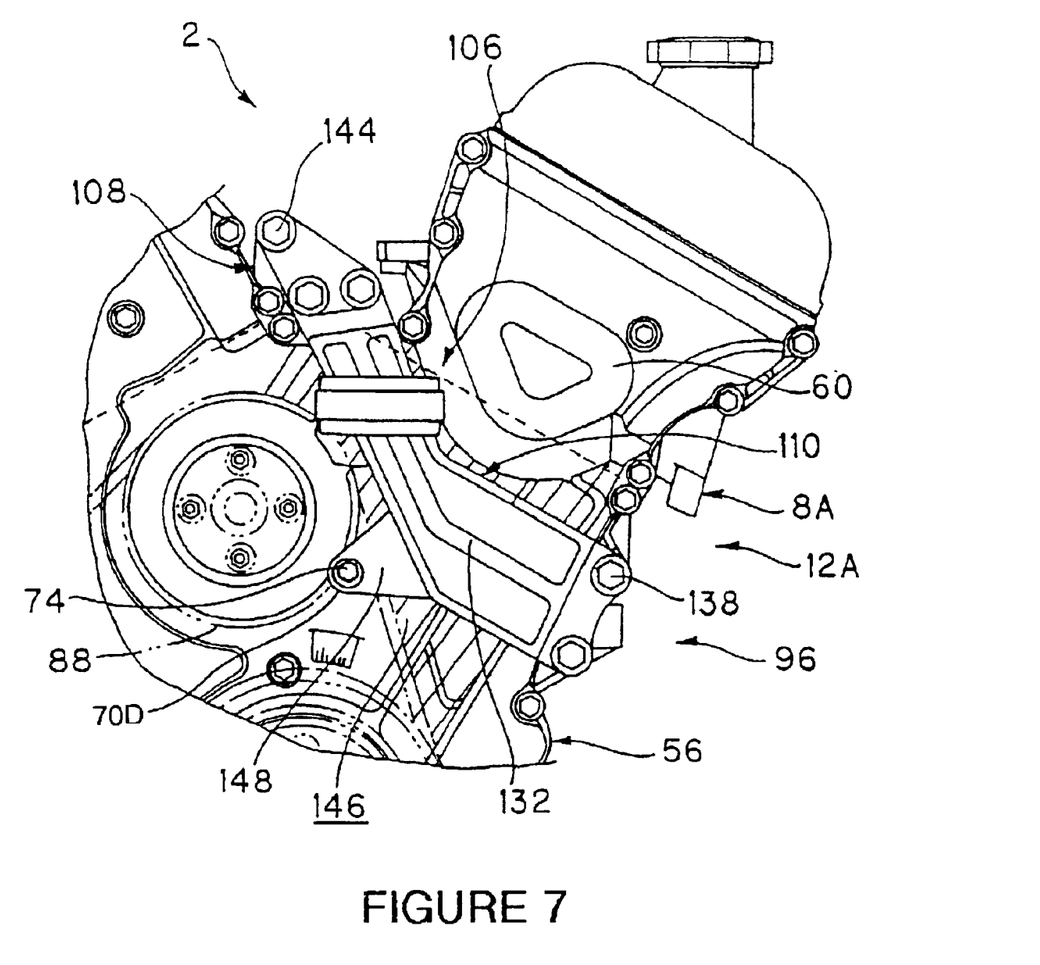
FIG. 7 is a front view, partially cut away, of a V-configured engine provided with a mounting device according to a second embodiment of the present invention.

FIG. 7 is a front view of a portion of a V-configured engine provided with a mounting device according to a second embodiment of the present invention. A mounting device 96 according to the second embodiment includes a central mounting flange 148 disposed on an extension portion 132 of a second mounting bracket portion 110, the central mounting flange 148 protruding toward the central cover-side mounting portion 70D. In the mounting device 96 according to the second embodiment, the central mounting flange 148 of the second mounting bracket portion 110 is fixed to the central block mounting portion 64D (see FIG. 2) together with the central cover-side mounting portion 70D by commonly using the cover-fixing bolt 74.

In the mounting device 96 according to the second embodiment, as described above, the central mounting flange 148 of the second mounting bracket portion 110 is fixed to the cylinder block 4 together with the central block mounting portion 64D by commonly using the cover-fixing, threaded bolt 74. That is, the engine-mounting bracket 106 is fixed to three positions spaced from each other, namely, the top A bracket mount 100 at the top of the cylinder block 4, the outer bracket mount 102, and the central block mounting portion 64D. The engine-mounting bracket, according to the second embodiment, can be affixed more firmly than the engine-mounting bracket, according to the first embodiment.

The engine-mounting bracket 106 of the mounting device 96 according to the second embodiment can be supported more firmly than the engine-mounting bracket 106 of the mounting device 96 according to the first embodiment, whereby a sufficient supporting force can be ensured and the mounting strength of the engine-mounting bracket 106 can be further increased.

Figure 8:
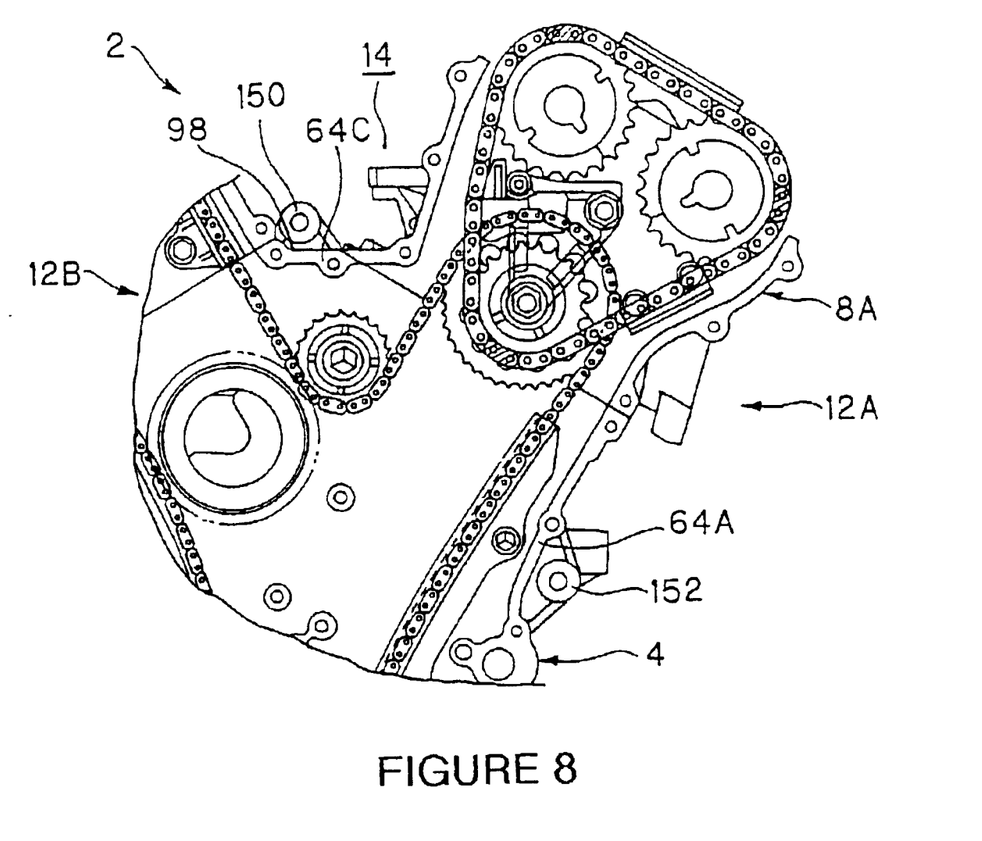
FIG. 8 is a front view, partially cut away, of the V-configured engine provided with a mounting device according to a third embodiment of the present invention, with a chain cover being removed.
Figure 9:
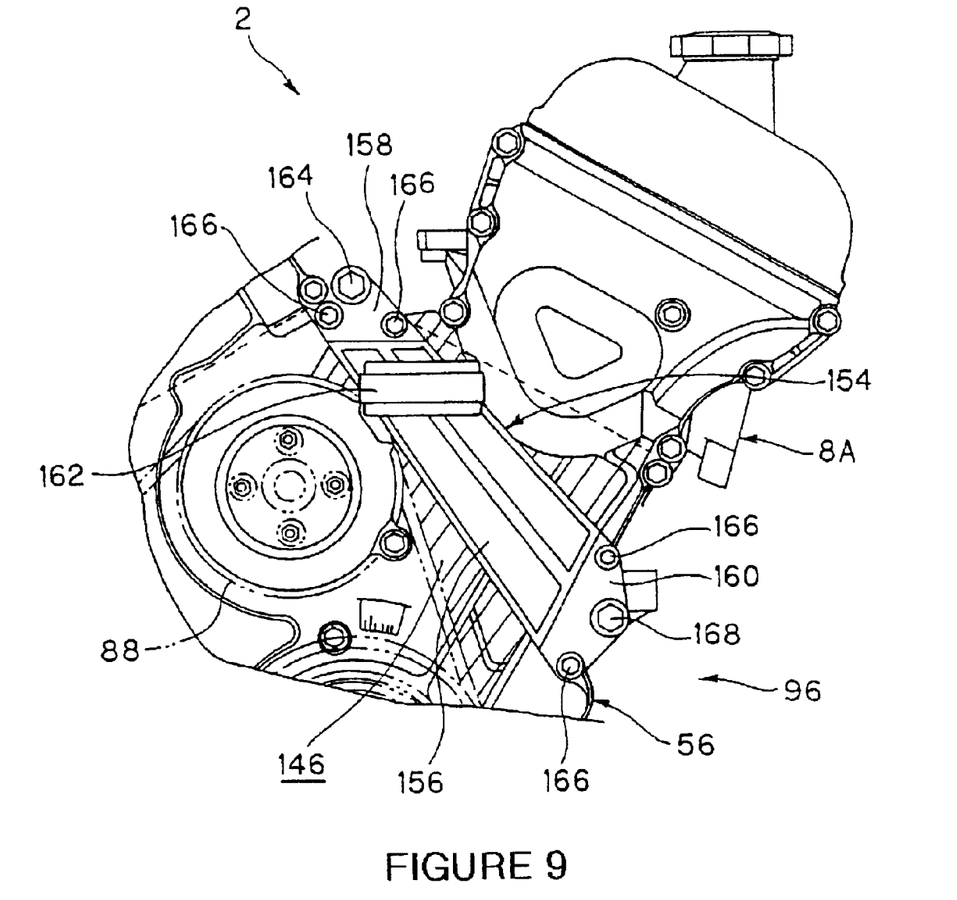
FIG. 9 is a front view, partially cut away, of the V-configured engine provided with the mounting device according to the third embodiment.

FIGS. 8 and 9 are front views of a portion of a V-configured engine provided with a mounting device according to a third embodiment of the present invention. In FIG. 8, a mounting device 96 according to the third embodiment includes a top bracket mount 150 adjacent to the upper block-side mounting portion 64C which is disposed at an upper portion of the front end of the block top 98 of the cylinder block 4 in the space 14 between the engine banks 12A and 12B. The mounting device 96 also includes an outer bracket mount 152 adjacent to the outer block-side mounting portion 64A which is disposed at the outer side of the front end of the cylinder bank 6A of the cylinder block 4.

In the mounting device 96 shown in FIG. 9, an engine-mounting bracket 154 is disposed at the front side of the chain cover 56 and is fixed to the cylinder block 4 at the longitudinal ends of the engine-mounting bracket 154. The engine-mounting bracket 154, according to the third embodiment, is not formed with two independent parts, as in the first and second embodiments, and is formed with a single part disposed in the recess 146 formed in the front side of the chain cover 56. The engine-mounting bracket 154 is formed such that a substantially straight extension portion 156 is provided with a top mounting flange 158 at a longitudinal end of the extension portion 156, an outer mounting flange 160 at the other longitudinal end, and an engine mount mounting portion 162 protruding forward, for mounting an engine mount (not shown), from an intermediate portion of the extension portion 156.

In the mounting device 96 according to the third embodiment, the top mounting flange 158 of the engine-mounting bracket 154 is fixed to the top bracket mount 150 by a fixing bolt 164, the top mounting flange 158 being fixed to the upper block-side mounting portion 64C together with the upper cover-side mounting portion 70C by commonly using a cover-fixing bolt 166, and the outer mounting flange 160 is fixed to the outer bracket mount 152 by a fixing bolt 168, the outer mounting-flange 160 being fixed to the outer block-side mounting portion 64A together with the outer cover-side mounting portion 70A by commonly using the cover-fixing bolt 166.

In the mounting device 96 according to the third embodiment, the engine-mounting bracket 154 is fixed to the cylinder block 4 at two positions separated from each other by exclusively using the bolts 164 and 168 but also by commonly using the cover-fixing bolts 166, whereby the engine-mounting bracket 154 can be firmly supported by using the cover-fixing bolts 166 which are conventional parts.

Therefore, in the mounting device 96 according to the third embodiment, the mounting strength of the engine-mounting bracket 154 can be increased while reducing the number of exclusive fixing bolts 164 or 168. In the mounting device 96 according to the third embodiment, the extension portion 156 of the engine-mounting bracket 154 is formed substantially straight without being bent at an intermediate portion thereof, as in the first embodiment. Therefore, concentration of an external force can be avoided, thereby reducing risks of deformation.

Although according to the above embodiments, the engine-mounting bracket 106 or 154 is formed independently from the chain cover 56, it may be formed unitarily with the chain cover 56. An opening for inspection (not shown) may be formed in the recess 146 which is formed in the front side of the chain cover 56 and a closing portion (not shown) for closing the opening may be provided at the side of the engine-mounting bracket 106 or 154. With this arrangement, the chain arrangement 40 can be inspected by accessing inside the chain cover 56 only by removing the engine-mounting bracket 106 or 154 from the cylinder block 4 and without removing the chain cover 56.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The present disclosure relates to subject matter contained in priority Japanese Application No. 2001-301926, filed on Sep. 28, 2001, which is herein expressly incorporated by reference in its entirety.

What is claimed is:

1. A mounting device for a V-configured engine in which engine banks include cylinder banks of a V-configured cylinder block, each cylinder bank including a cylinder head mounted thereon, the cylinder block being provided with a crankshaft journaled by bearings, each cylinder head being provided with camshafts journaled by bearings, a chain arrangement to transmit a rotation of the crankshaft to the camshafts provided at front ends of the cylinder block and the cylinder heads in an axial direction of the crankshaft, and a chain cover to cover the chain arrangement mounted on front end faces of the cylinder block and the cylinder heads, said mounting device comprising:

a top bracket mount provided at a top of the cylinder block in a space between the engine banks;

an outer bracket mount provided at an outer side of one of the cylinder banks of the cylinder block; and a generally elongate engine mounting bracket provided at a front side of the chain cover and fixed to said top bracket mount and said outer bracket mount at respective longitudinal ends of said engine mounting bracket such that said engine mounting bracket does not obstruct access to a central portion of a water pump pulley, wherein said engine mounting bracket and the chain cover are separate elements.

2. The mounting device for a V-configured engine according to claim 1, wherein the chain arrangement includes a first chain to transmit rotation of the crankshaft to an intermediary shaft mounted on one of the cylinder heads and one of the camshafts journaled by bearings in the other one of the cylinder heads, and a second chain to transmit rotation of the crankshaft through the intermediary shaft to the camshafts journaled by bearings in the one of the cylinder heads, the second chain being provided at the front side of the first chain;

wherein the chain cover includes a first chain cover portion to cover the first chain, and a second chain cover portion to cover the second chain that projects forward from the first chain cover portion, and the water pump pulley of a water pump provided at a front end face of the other one of the cylinder banks extending forward from a portion opposing the other one of the cylinder banks; and wherein said engine mounting bracket is provided in a recess formed in a front side of the first chain cover portion between the water pump pulley and the second chain cover portion.

3. The mounting device for a V-configured engine according to claim 1, wherein said engine mounting bracket comprises a first mounting bracket portion to be mounted on the top bracket mount and a second mounting bracket portion to be mounted on the outer bracket mount.

4. The mounting device for a V-configured engine according to claim 3, wherein said first mounting bracket portion is provided with a top mounting flange to be mounted on the top bracket mount, said top mounting flange provided with a plurality of mounting holes formed along the periphery thereof and a hole through which a cooling water pipe for guiding cooling water to the cylinder block passes formed at a central portion of said top mounting flange enclosed by the plurality of mounting holes.

5. The mounting device for a V-configured engine according to claim 4, wherein said first mounting bracket portion includes a top connecting flange and a connection portion that connects said top mounting flange and said top connection flange, wherein said top connecting flange includes a surface positioned parallel to the front face of the cylinder block.

6. The mounting device for a V-configured engine according to claim 5, wherein said top connecting flange includes a plurality of threaded holes for connection with said second mounting bracket portion.

7. The mounting device for a V-configured engine according to claim 3, wherein said second mounting bracket portion includes an outer mounting flange to be mounted on the outer bracket mount, said outer mounting flange provided with a plurality of mounting holes corresponding to a plurality of mounting holes provided in the outer bracket mount.

8. The mounting device for a V-configured engine according to claim 7, said second mounting bracket portion including an extension portion extending from said outer mounting flange and an outer connecting flange provided at the distal end of said extension portion, said outer connecting flange including a surface positioned parallel to the front face of the cylinder block.

9. The mounting device for a V-configured engine according to claim 8, wherein said outer connecting flange includes a plurality of mounting holes for connection with said first mounting bracket portion.

10. The mounting device for a V-configured engine according to claim 8, said second mounting bracket portion further including an engine mount mounting portion extending from said extension portion in a forward direction, said engine mount mounting portion configured to receive an engine mount.

11. The mounting device for a V-configured engine according to claim 8, said second mounting bracket portion further including a central mounting flange provided on said extension portion, said central mounting flange configured to connect with a central block mounting portion of the cylinder block.

12. The mounting device for a V-configured engine according to claim 1, wherein said engine mounting bracket includes:

an extension portion;

a top mounting flange provided at a longitudinal end of said extension portion, said top mounting flange including mounting holes for connection with threaded holes on a top bracket mount; and an outer mounting flange provided at the other longitudinal end of said extension portion, said outer mounting flange including mounting holes for connection with threaded holes on said outer bracket mount.

13. The mounting device for a V-configured engine according to claim 12, wherein said top mounting flange and said outer mounting flange of said mounting bracket are further connected to said cylinder block with chain cover connecting elements.

14. The mounting device for a V-configured engine according to claim 12, wherein said mounting bracket further includes an engine mount mounting portion extending from an intermediate position of said extension portion in a forward direction, said engine mount mounting portion for mounting an engine mount.

15. A generally elongate engine mounting bracket for attachment to a V-configured engine, said engine mounting bracket comprising:

end portions spaced from each other in a longitudinal direction of said engine mounting bracket; and said engine mounting bracket being configured to be fixed to the V-configured engine on a top bracket mount and an outer bracket mount at respective end portions of said engine mounting bracket so that said engine mounting bracket is provided at a front side of a chain cover of the V-configured engine such that it does not obstruct access to a central portion of a water pump pulley, wherein said engine mounting bracket and the chain cover are separate elements.

16. The engine mounting bracket for attachment to a V-configured engine according to claim 15, wherein said engine mounting bracket comprises a first mounting bracket portion to be mounted on the top bracket mount and a second mounting bracket portion to be mounted on the outer bracket mount.

17. The engine mounting bracket for attachment to a V-configured engine according to claim 16;

said first mounting bracket portion further including a top mounting flange to be mounted on the top bracket mount, said top mounting flange provided with a plurality of mounting holes formed along the periphery thereof and a hole through which a cooling water pipe for guiding cooling water to a cylinder block of the V-configured engine passes formed at a central portion of said top mounting flange enclosed by the plurality of mounting holes, a top connecting flange, and a connection portion that connects said top mounting flange and said top connection flange;

said second mounting bracket portion including an outer mounting flange to be mounted on the outer bracket mount, said outer mounting flange provided with a plurality of mounting holes corresponding to a plurality of mounting holes provided in the outer bracket mount, an extension portion extending from said outer mounting flange, and an outer connecting flange provided at the distal end of said extension portion; and wherein said top connecting flange includes a plurality of threaded holes for connection with said second mounting bracket portion and said outer connecting flange includes a plurality of mounting holes for connection with said first mounting bracket portion.

18. The engine mounting bracket for attachment to a V-configured engine according to claim 16, said second mounting bracket portion further including an engine mount mounting portion extending from an extension portion, said mount mounting portion being configured to receive an engine mount.

19. The engine mounting bracket for attachment to a V-configured engine according to claim 16, said second mounting bracket portion further including a central mounting flange provided on said extension portion, said central mounting flange being configured to connect with a central block mounting portion of a cylinder block of the V-configured engine.

20. The engine mounting bracket for attachment to a V-configured engine according to claim 15, wherein said engine mounting bracket includes:

an extension portion;

a top mounting flange provided at a first longitudinal end of said extension portion, said top mounting flange including mounting holes for connection with threaded holes on a top bracket mount; and an outer mounting flange provided at a second longitudinal end of said extension portion, said outer mounting flange including mounting holes for connection with threaded holes on said outer bracket mount.

21. A mounting device for a V-configured engine in which engine banks include cylinder banks of a V-configured cylinder block, each cylinder bank including a cylinder head mounted thereon, the cylinder block being provided with a crankshaft journaled by bearings, each cylinder head being provided with camshafts journaled by bearings, a chain arrangement to transmit a rotation of the crankshaft to the camshafts provided at front ends of the cylinder block and the cylinder heads in an axial direction of the crankshaft, and a chain cover to cover the chain arrangement mounted on front end faces of the cylinder block and the cylinder heads, said mounting device comprising:

a top bracket mount provided at a top of the cylinder block in a space between the engine banks;

an outer bracket mount provided at an outer side of one of the cylinder banks of the cylinder block; and an engine mounting bracket provided at a front side of the chain cover and fixed to said top bracket mount and said outer bracket mount at respective longitudinal ends of said engine mounting bracket, wherein the chain arrangement includes a first chain to transmit rotation of the crankshaft to an intermediary shaft mounted on one of the cylinder heads and one of the camshafts journaled by bearings in another of the cylinder heads, and a second chain to transmit rotation of the crankshaft through the intermediary shaft to the camshafts journaled by bearings in the one of the cylinder heads, the second chain being provided at the front side of the first chain;

wherein the chain cover includes a first chain cover portion to cover the first chain, and a second chain cover portion to cover the second chain that projects forward from the first chain cover portion, wherein a water pump pulley of a water pump is provided at a front end face of the another of the cylinder banks extending forward from a portion opposing the other one of the cylinder banks; and wherein said engine mounting bracket is provided in a recess formed in a front side of the first chain cover portion between the water pump pulley and the second chain cover portion.

22. A mounting device for a V-configured engine in which engine banks include cylinder banks of a V-configured cylinder block, each cylinder bank including a cylinder head mounted thereon, the cylinder block being provided with a crankshaft journaled by bearings, each cylinder head being provided with camshafts journaled by bearings, a chain arrangement to transmit a rotation of the crankshaft to the camshafts provided at front ends of the cylinder block and the cylinder heads in an axial direction of the crankshaft, and a chain cover to cover the chain arrangement mounted on front end faces of the cylinder block and the cylinder heads, said mounting device comprising:

a top bracket mount provided at a top of the cylinder block in a space between the engine banks;

an outer bracket mount provided at an outer side of one of the cylinder banks of the cylinder block; and an engine mounting bracket provided at a front side of the chain cover and fixed to said top bracket mount and said outer bracket mount at respective longitudinal ends of said engine mounting bracket, wherein said engine mounting bracket comprises a first mounting bracket portion provided with a top mounting flange mounted on the top bracket mount, said top mounting flange being provided with a plurality of mounting holes formed along a periphery thereof and a hole through which a cooling water pipe for guiding cooling water to the cylinder block passes formed at a central portion of said top mounting flange enclosed by the plurality of mounting holes.

23. A mounting device for a V-configured engine in which engine banks include cylinder banks of a V-configured cylinder block, each cylinder bank including a cylinder head mounted thereon, the cylinder block being provided with a crankshaft journaled by bearings, each cylinder head being provided with camshafts journaled by bearings, a chain arrangement to transmit a rotation of the crankshaft to the camshafts provided at front ends of the cylinder block and the cylinder heads in an axial direction of the crankshaft, and a chain cover to cover the chain arrangement mounted on front end faces of the cylinder block and the cylinder heads, said mounting device comprising:

a top bracket mount provided at a top of the cylinder block in a space between the engine banks;

an outer bracket mount provided at an outer side of one of the cylinder banks of the cylinder block; and an engine mounting bracket provided at a front side of the chain cover and fixed to said top bracket mount and said outer bracket mount at respective longitudinal ends of said engine mounting bracket, wherein a top mounting flange provided at a first longitudinal end of an extension portion of said engine mounting bracket and an outer mounting flange provided at a second longitudinal end of said extension portion of said engine mounting bracket are connected to said cylinder block with chain cover connecting elements.

24. An engine mounting bracket for attachment to a V-configured engine, said engine mounting bracket comprising:

end portions spaced from each other in a longitudinal direction of said engine mounting bracket; and said engine mounting bracket being configured to be fixed to the V-configured engine on a top bracket mount and an outer bracket mount at respective end portions of said engine mounting bracket so that said engine mounting bracket is provided at a front side of a chain cover of the V-configured engine, wherein said engine mounting bracket comprises a first mounting bracket portion mounted on the top bracket mount and a second mounting bracket portion mounted on the outer bracket mount, said first mounting bracket portion further including a top mounting flange to be mounted on the top bracket mount, said top mounting flange being provided with a plurality of mounting holes formed along a periphery thereof and a hole through which a cooling water pipe for guiding cooling water to a cylinder block of the V-configured engine passes formed at a central portion of said top mounting flange enclosed by the plurality of mounting holes, a top connecting flange, and a connection portion that connects said top mounting flange and said top connection flange;

said second mounting bracket portion including an outer mounting flange mounted on the outer bracket mount, said outer mounting flange being provided with a plurality of mounting holes corresponding to a plurality of mounting holes provided in the outer bracket mount, an extension portion extending from said outer mounting flange, and an outer connecting flange being provided at a distal end of said extension portion; and wherein said top connecting flange includes a plurality of threaded holes for connection with said second mounting bracket portion and said outer connecting flange, said second mourning bracket portion further including an engine mount mounting portion extending from an extension portion, said mount mounting portion being configured to receive an engine mount.

* * * * *

UNITED STATES PATENT AND TRADEMARK OFFICE
CERTIFICATE OF CORRECTION

| | |
|---|---|
| PATENT NO. | : 6,976,554 B2 |
| APPLICATION NO. | : 10/237117 |
| DATED | : December 20, 2005 |
| INVENTOR(S) | : T. Tsuruda |

It is certified that error appears in the above-identified patent and that said Letters Patent is hereby corrected as shown below:

At column 18, line 21 (claim 24, line 38) of the printed patent, "mourning" should be --mounting--.

Signed and Sealed this

Twelfth Day of September, 2006

JON W. DUDAS
*Director of the United States Patent and Trademark Office*